(12) United States Patent
Lee

(10) Patent No.: US 9,688,308 B2
(45) Date of Patent: Jun. 27, 2017

(54) PRE-ALERT OF LCC'S STEERING TORQUE LIMIT EXCEED

(71) Applicant: GM GLOBAL TECHNOLOGY OPERATIONS LLC, Detroit, MI (US)

(72) Inventor: Jin-Woo Lee, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/038,173

(22) PCT Filed: Dec. 6, 2013

(86) PCT No.: PCT/US2013/073684
§ 371 (c)(1),
(2) Date: May 20, 2016

(87) PCT Pub. No.: WO2015/084406
PCT Pub. Date: Jun. 11, 2015

(65) Prior Publication Data
US 2016/0288831 A1    Oct. 6, 2016

(51) Int. Cl.
| | | |
|---|---|---|
| *B62D 15/02* | (2006.01) |
| *B62D 6/00* | (2006.01) |
| *B60W 10/20* | (2006.01) |
| *B60W 30/10* | (2006.01) |
| *B60W 30/12* | (2006.01) |

(52) U.S. Cl.
CPC ........... *B62D 15/025* (2013.01); *B60W 10/20* (2013.01); *B60W 30/10* (2013.01); *B60W 30/12* (2013.01); *B62D 6/00* (2013.01); *B62D 6/002* (2013.01); *B62D 15/029* (2013.01); *B60Y 2300/12* (2013.01); *B60Y 2400/90* (2013.01)

(58) Field of Classification Search
None
See application file for complete search history.

(56) References Cited

U.S. PATENT DOCUMENTS

| | | | |
|---|---|---|---|
| 8,108,134 B2 * | 1/2012 | Kageyama | B60R 21/0134 382/104 |
| 8,170,739 B2 * | 5/2012 | Lee | B62D 15/025 340/435 |
| 8,170,751 B2 * | 5/2012 | Lee | B62D 1/286 180/204 |

(Continued)

*Primary Examiner* — Russell Frejd
(74) *Attorney, Agent, or Firm* — John A. Miller; Miller IP Group, PLC

(57) ABSTRACT

A method for providing a warning to a vehicle driver when a lane keeping and/or lane centering system will be unable to negotiate a tight curve at the present vehicle speed prior to the vehicle reaching the curve. The method obtains lane information at a predetermined number of sample times in the future and generates a desired path for the vehicle. The method also obtains vehicle motion information and determines steering angles for the vehicle for the vehicle to track the desired path based on the desired path and vehicle motion. The method determines the steering torque for each of the steering angles and determines whether any of the steering torques exceed the predetermine torque limit. The method issues an alert if any of the steering torques do exceed the predetermined torque limit prior to the lane keeping system being required to provide that torque to steer the vehicle.

20 Claims, 6 Drawing Sheets

(56) References Cited

U.S. PATENT DOCUMENTS

| | | | | |
|---|---|---|---|---|
| 8,190,330 B2* | 5/2012 | Lee | ............... | B62D 1/28 |
| | | | | 342/71 |
| 2010/0145575 A1* | 6/2010 | Switkes | ............... | B62D 15/025 |
| | | | | 701/41 |
| 2012/0029773 A1* | 2/2012 | Fujita | ............... | B60W 30/12 |
| | | | | 701/41 |
| 2012/0283910 A1* | 11/2012 | Lee | ............... | B62D 1/286 |
| | | | | 701/41 |
| 2014/0249721 A1* | 9/2014 | Schindler | ............... | B60W 10/04 |
| | | | | 701/41 |
| 2015/0158524 A1* | 6/2015 | Lee | ............... | B62D 15/025 |
| | | | | 701/41 |

\* cited by examiner

PRE-ALERT OF LCC'S STEERING TORQUE LIMIT EXCEED

BACKGROUND OF THE INVENTION

Field of the Invention

This invention relates generally to a system and method for providing a driver alert in connection with a lane centering (LC) and/or lane keeping (LK) in an autonomous or semi-autonomous driven vehicle and, more particularly, to a system and method for providing a driver alert in connection with a lane centering and/or lane keeping in an autonomous or semi-autonomous driven vehicle that includes providing an early warning to the vehicle driver that the LC or LK system is unable to negotiate an upcoming turn at the present vehicle speed.

Discussion of the Related Art

The operation of modern vehicles is becoming more autonomous, i.e., vehicles are able to provide more driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving vehicle is detected in front of the subject vehicle using various sensors, such as radar, LiDAR and cameras. Modern vehicle control systems may also include autonomous parking where the vehicle will automatically provide the steering control for parking the vehicle, and where the control system will intervene if the driver makes harsh steering changes that may affect vehicle stability and lane centering capabilities, where the vehicle system attempts to maintain the vehicle near the center of the lane. Fully autonomous vehicles have been demonstrated that drive in simulated urban traffic up to 30 mph, while observing all of the rules of the road.

As vehicle systems improve, they will become more autonomous with the goal being a completely autonomously driven vehicle. Future vehicles will likely employ autonomous systems for lane changing, lane keeping, lane centering, passing, turns away from traffic, turns into traffic, etc. As these systems become more prevalent in vehicle technology, it will also be necessary to determine what the driver's role will be in combination with these systems for controlling vehicle speed, steering and overriding the autonomous system.

An example of semi-autonomous vehicle control systems can be found in U.S. Pat. No. 8,190,330, issued May 29, 2012, titled "Model Based Predictive Control for Automated Lane centering/changing control systems," assigned to the assignee of this application and herein incorporated by reference, which discloses a system and method for providing steering angle control for lane centering and lane changing purposes in an autonomous or semi-autonomous vehicle. U.S. Pat. No. 8,170,751, issued May 1, 2012, titled "Detection of Driver Intervention During a Torque Overlay Operation in an Electric Power Steering System," assigned to the assignee of this application and herein incorporated by reference, discloses a system and method for controlling vehicle steering by detecting a driver intervention in a torque overly operation.

As mentioned, lane centering and/or lane keeping systems have been demonstrated in the art that cause the vehicle to autonomously follow the vehicle travel lane. Current lane centering and lane keeping controllers typically have a maximum steering torque limit, for example, 3 Newton-meters, for safety purposes. However, under certain driving conditions, such as driving at highway speeds and negotiating a turn having a relative tight radius of curvature, such as 500 meters, the steering torque limit is not high enough to maintain the vehicle in the lane. Particularly, under these types of conditions, the vehicle steering needs more than 3 Newton-meters of steering torque to stay within the lane. Because that amount of torque is beyond what the lane centering system can provide, the lane centering and/or lane keeping algorithms must address this situation. Current lane centering and lane keeping controllers often employ lane departure warnings when the vehicle begins traveling outside of the lane. Because the vehicle driver may not be fully attentive during autonomous vehicle driving, any lane departure warning given by the system when the vehicle is leaving the lane may be too late for the vehicle operator to take over control of the vehicle and stay within the lane. Therefore, there is a need in the art to provide a warning in advance of this situation so that the driver can adequately respond.

The discussion above refers to determining steering torque for lane keeping purposes. A typical lane keeping or lane changing control algorithm calculates vehicle steering angle as a command to steer the vehicle and not steering torque. However, most steering systems, for example, electrical power steering (EPS) systems, typically only accept steering torque as a command. Therefore, these systems require some technique for converting steering angle to steering torque. An inaccurate conversion of steering angle to steering torque may cause vehicle oscillations during a lane control maneuver. Current steering models are generally not applicable for converting steering angle to steering torque in lane control algorithms because of limited computing power, the non-existence of suitable sensors and the inaccuracy of the angle to torque conversions for stop and go situations. Thus, there is a need in the art to effectively convert a steering angle command to a steering torque command in these types of lane control systems.

SUMMARY OF THE INVENTION

This disclosure describes a system and method for providing a warning or alert to a vehicle driver when a lane keeping and/or lane centering system will be unable to negotiate a tight curve at the present vehicle speed prior to the vehicle reaching the curve. When the lane centering/lane keeping system is engaged, the method obtains lane information concerning the lane at a predetermined number of sample times in the future and generates a desired path for the vehicle to maintain the vehicle in the lane for each of the sample times. The method also obtains vehicle motion information required to maintain the vehicle on the desired path for each of the sample times and determines steering angles for the vehicle that are necessary for the vehicle to track the desired path based on the desired path and vehicle motion. The method determines the steering torque required to steer the vehicle for the next few seconds and determines whether any of the steering torques in the next few seconds exceed the predetermine torque limit. The method issues an alert if any of the steering torques do exceed the predetermined torque limit prior to the vehicle departing the lane or the lane keeping system being required to provide that torque to steer the vehicle.

Additional features of the present invention will become apparent from the following description and appended claims, taken in conjunction with the accompanying drawings.

BRIEF DESCRIPTION OF THE DRAWINGS

FIG. 5 is an illustration showing vehicle lateral dynamics;

DETAILED DESCRIPTION OF THE EMBODIMENTS

The following discussion of the embodiments of the invention directed to a system and method for providing an early driver alert when a lane centering and/or lane keeping system is unable to negotiate a tight curve is merely exemplary in nature, and is in no way intended to limit the invention or its applications or uses.

Figure 1:
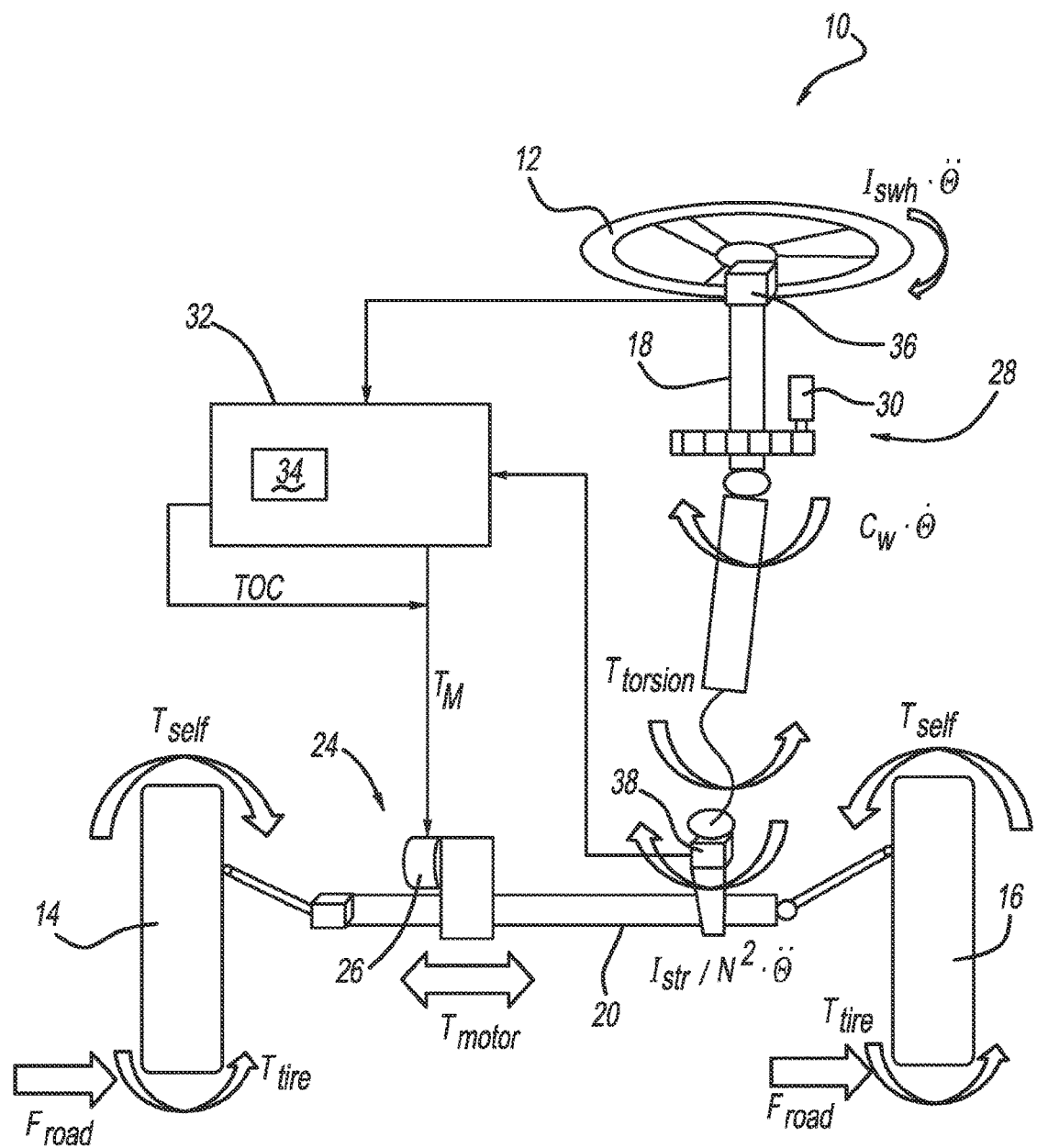
FIG. 1 is an illustration of an exemplary vehicle steering system.

The following description includes a discussion of the relationship between vehicle steering angle and vehicle steering torque. FIG. 1 illustrates an exemplary vehicle steering system 10 including a steering wheel 12 and road wheels 14 and 16 for this discussion. The steering wheel 12 is coupled to the wheels 14 and 16 through a steering column 18 and an axle 20 in a manner that is well understood by those skilled in the art so that when the driver turns the steering wheel 12 the wheels 14 and 16 turn accordingly.

The steering system 10 includes an electric power steering (EPS) system 24 having an electric steering motor 26 mounted to the axle 20 that provides electric steering assist in response to the vehicle driver turning the steering wheel 12 in a manner that is well understood in the art. In other words, when the vehicle driver turns the steering wheel 12, the EPS system 24 turns the wheels 14 and 16 the amount commanded by the vehicle driver so that the turning of the wheels 14 and 16 on the roadway is easier. The vehicle system 10 may also include an active front steering (AFS) system 28 including an electric motor 30 mounted to the steering column 18. AFS systems are well known to those skilled in the art that provide additional steering, or corrective steering, in various types of vehicle stability control systems in connection with the vehicle driver turning the steering wheel 12, where the AFS system 28 decouples the steering wheel 12 from the wheels 14 and 16.

The steering system 10 also includes an EPS electronic control unit (ECU) 32, which in one embodiment is configured to provide overall EPS system control. The ECU 32 also includes a lane centering and/or lane keeping system 34 for providing adaptive lane keeping and lane centering control in an autonomous or semi-autonomous vehicle consistent with the discussion herein. As understood by one of ordinary skill in the art, the EPS system 24 electrically assists a driver in the steering of the vehicle by applying a variable motor torque command $T_M$ to the steering motor 26 and, as needed, a torque overlay command (TOC) that alters the value of the motor torque command $T_M$ during an EPS-assisted steering maneuver.

A steering angle sensor 36 mounted to the steering column 18 measures the rotation of the steering wheel 12 and the steering column 18 and provides a steering angle signal $\theta_s$ indicative of same. A torque sensor 38 mounted to the steering column 18 measures the torque on the steering column 18 and provides a torque signal $T_s$ indicative of same. The ECU 32 is in electrical communication with the angle sensor 34 and the torque sensor 38 such that the steering angle signal $\theta_s$ and the steering torque signal $T_s$ are made available to the ECU 32. The ECU 32 processes a set of vehicle performance values, including the steering angle signal $\theta_s$ and the steering torque signal $T_s$, and continuously monitors vehicle parameters, such as, but not limited to, the speed of the vehicle, the vehicle yaw rate, vehicle lateral and longitudinal acceleration, etc. In addition, the ECU 32 may be configured to receive data from various lane detection sensors, which are generally mounted to the exterior of the vehicle. In many systems, the lane detection sensors include lane detection cameras mounted to various locations on the vehicle, such as the front windshield of the vehicle, under the vehicle side mirrors, etc., which are configured to sense lane markings affixed to the roadway. The lane markings generally indicate the boundaries defining the geometry of the lane, including the lane center. One of ordinary skill in the art would understand that processors and ECUs other than ECU 32 may be used by the lane control system 34 to monitor and determine the center of the lane.

Figure 2:
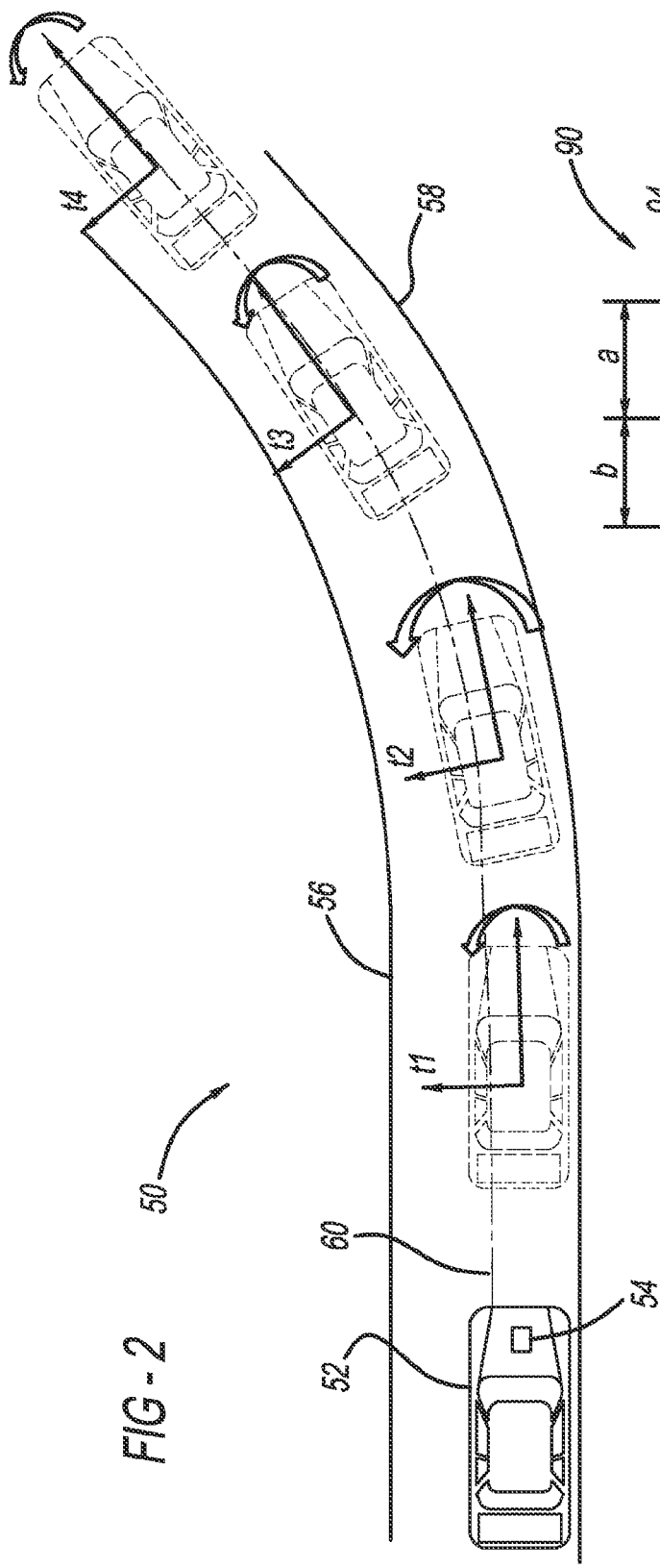
FIG. 2 is an illustration of a subject vehicle traveling in a vehicle lane having a curve.

FIG. 2 is an illustration 50 showing a subject vehicle 52 including a forward looking camera 54 traveling in a lane 56 and approaching a curve 58 in the lane 56. The camera 54 is intended to represent all combinations of cameras, sensors, radar, lidar, etc. on the vehicle 52 for detecting lane markings and other objects around the vehicle 52. The lane centering/lane keeping system 34 is attempting to maintain the subject vehicle 52 at the center of the lane 56 represented by line 60. Through the processes discussed herein and known in the art, the system 34 provides steering torque to the vehicle 52 to provide the lane centering and lane keeping by the anticipated position of the vehicle 52 at future times $t_1$, $t_2$, $t_3$, $t_4$, etc. as it negotiates the curve 58.

The present invention proposes an early warning alert to the vehicle driver in advance of when the lane centering/lane keeping system 34 is unable to maintain the vehicle 52 in the lane 56 as a result of vehicle speed and curve radius due to a maximum steering torque limit on the system 34. By providing a warning in advance to the driver that the lane centering/lane keeping steering control may have to make adjustments in speed to maintain the lane centering, the driver will be able to take over the vehicle control if desired to maintain the vehicle speed. Current systems often employ a lane departure warning (LDW) that alerts the vehicle driver when the vehicle 52 is outside of the lane boundary. However, this alert may not be early enough for the driver to take over the steering control to maintain the vehicle 52 in the lane 56. Typically for highway speeds, the vehicle 52 can get out of the lane 56 in a fraction of a second. Thus, an early driver warning is important to reduce the chance of road accidents.

Figure 3:
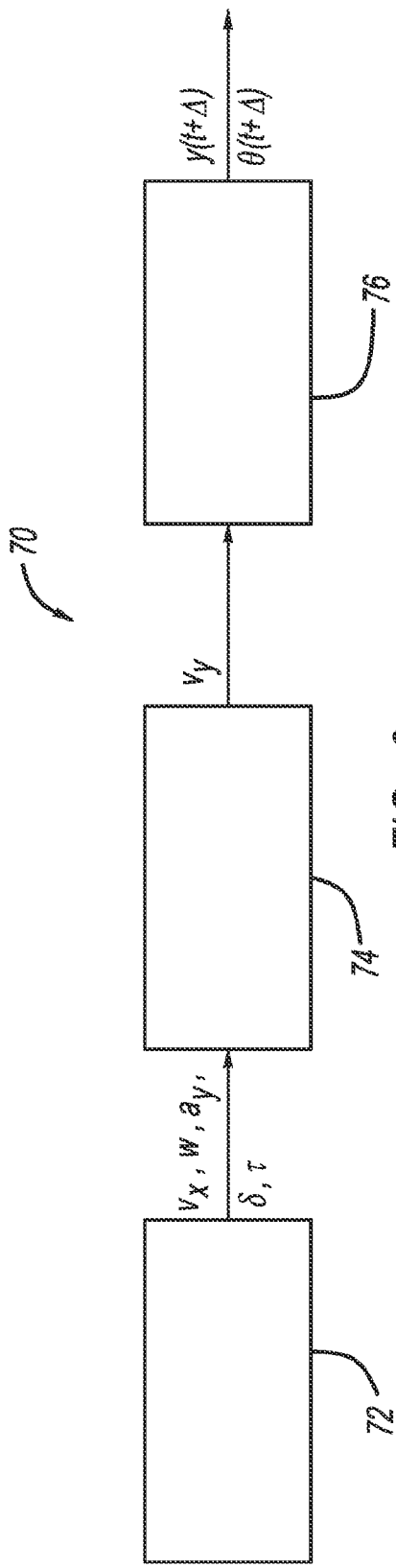
FIG. 3 is a flow block diagram showing a known process for predicting a vehicle path.

FIG. 3 is a flow block diagram 70 showing a process for a known path prediction algorithm for predicting the path of the vehicle 52 for lane centering and lane keeping. Box 72 represents the vehicle sensing devices and systems that provide various vehicle parameters and variables to provide the path prediction including vehicle longitudinal speed $v_x$, vehicle yaw rate w, vehicle lateral acceleration $a_y$, vehicle steering angle $\delta$ and steering torque $\tau$. These parameters and variables are sent to a vehicle dynamics box 74 that calculates the vehicle lateral speed $v_y$ by known techniques. The vehicle lateral speed $v_y$ is the amount of vehicle speed that the vehicle 52 needs to employ to cause the vehicle 52 to steer to the center line 60 and follow the desired vehicle path for lane centering purposes. Based on the vehicle lateral speed $v_y$, a path prediction block 76 then determines the path of the vehicle 52 that gives the position of the vehicle 52 in the future at integer multiples of time intervals $\Delta$, for example, 100 ms, from the current time t, represented as the vehicle lateral distance $y(t+\Delta)$, and the vehicle heading angle $\theta(t+\Delta)$. FIG. 2 shows $t_1=t+\Delta$, $t_2=t+2\Delta$, $t_3=t+3\Delta$, etc. The lane centering algorithm uses the predicted path of the vehicle 52, represented by $y(t+\Delta)$ and $\theta(t+\Delta)$, to provide a steering command for the steering angle $\delta$ to cause the predicted path of the vehicle 52 to follow the center line 60. U.S. Pat. No. 8,170,739 issued May 1, 2012 to Lee, assigned to the assignee of this application and herein incorporated by reference, discloses more details for this process for vehicle path prediction.

Figure 4:
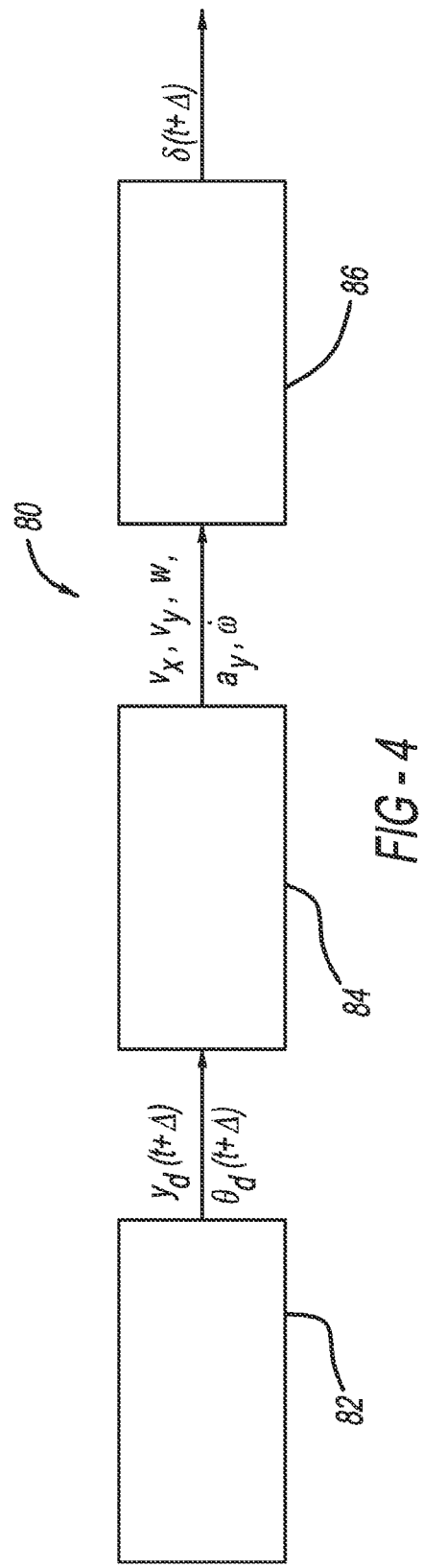
FIG. 4 is a flow block diagram showing a process for determining a vehicle steering angle.

The present invention can be interpreted as an inverse problem of determining the vehicle future path given the steering angle $\delta$. The present invention determines the steering angle $\delta$, and then the steering torque $\tau$ required to provide the steering angle $\delta$ from the desired path. FIG. 4 is a flow block diagram 80 showing a general overview of this process where the desired vehicle path in the next few time steps is provided at block 82 as $y_d(t+\Delta)$ and $\theta_d(t+\Delta)$, which are the same values, or similar values, as the predicted path from the block 76. For example, a good lane centering/lane keeping controller can control the vehicle to accurately follow the desired path. In this case, the vehicle's future path will be very close to the initially planned path. The desired path is sent to block 84 to determine the required vehicle motion to follow that path for each of those future time steps. Particularly, the algorithm determines the vehicle longitudinal speed $v_x$, the vehicle lateral speed $v_y$, the vehicle yaw rate w, the vehicle lateral acceleration $a_y$, and the vehicle yaw acceleration $\dot{w}$ at each time step. These vehicle motion parameters are provided to block 86 that employs an algorithm based on vehicle dynamics to calculate the vehicle steering angle $\delta$ at the future points in time to follow the desired path. As will be discussed below, this steering angle $\delta$ is then converted to the steering torque $\tau$ at those times to determine whether any of those torques exceeds the required maximum torque of the lane centering system 34, and if so, provide a driver alert.

The first step in the process is to capture the lane data within some preview distance from of the current location of the vehicle 52, for example, three seconds of travel distance, using the various sensing systems on the vehicle 52, such as the camera 54, GPS, map database, etc.

The next step in the process is to generate the desired path at the block 82 using the lane data. For example, the desired path can be represented by the polynomial equation:

$$y_n(x_n) = a_0 + a_1 x_n + a_2 x_n^2 + a_3 x_n^3 + a_4 x_n^4 + a_5 x_n^5, \quad (1)$$

$$0 \le x_n = \frac{x}{v_x \Delta T} \le 1, \quad (2)$$

$$y_n = \frac{y}{L}, \quad (3)$$

where x is the longitudinal distance from the vehicle center, y is the lateral distance from the vehicle center, $v_x$ is the vehicle longitudinal speed, L is the lane width and $\Delta T$ is the time of the path generation distance. The coefficients or parameters $a_1, a_2, \ldots, a_5$ are obtained from the lane geometry data measured by the lane sensing system, which is typically a forward looking camera.

Once the desired vehicle path is determined, i.e., all of the parameters $a_1, a_2, \ldots, a_5$ in equation (1) are determined, the next step in the process is to determine the vehicle state predictions or vehicle motion along that path at the block 84. Particularly, based on the desired path obtained by equation (1), the future vehicle motion represented by the vehicle longitudinal speed $v_x$, the vehicle lateral speed $v_y$, the vehicle yaw rate w, the vehicle lateral acceleration $a_y$, and the vehicle yaw acceleration $\dot{w}$ can be calculated at each time step from the path as:

$$v_y = \dot{y} - v_x \phi, \quad (4)$$

where:

$$\dot{y} \equiv dy/dt = y' v_x. \quad (5)$$

From the desired path:

$$y' = 5a_5 x^4 + 4a_4 x^3 + 3a_3 x^2 + 2a_2 x + a_1, \quad (6)$$

$$a_y = \ddot{y} = d^2 y/dt^2 = y'' v_x^2 + y' a_x, \quad (7)$$

$$y'' = 20a_5 x^3 + 12a_4 x^2 + 6a_3 x + 2a_2, \quad (8)$$

$$w = y', \quad (9)$$

$$\dot{w} = d(y')/dt = y'' v_x. \quad (10)$$

For the vehicle 52 to follow the desired path obtained by equation (1), the vehicle 52 should maintain the vehicle longitudinal speed $v_x$, the vehicle lateral speed $v_y$, the vehicle yaw rate w, the vehicle lateral acceleration $a_y$, and the vehicle yaw acceleration $\dot{w}$ obtained from equations (4), (7), (9) and (10), respectively.

Once the future vehicle motion is determined at each time step based on the parameters referred to above, the algorithm then calculates the expected steering angle $\delta$ from the desired vehicle path and the vehicle dynamics at those time steps. FIG. 5 is an illustration 90 showing vehicle wheels 92 and 94 and a lane center line 96 and including the variables employed in this calculation. For example, the steering angle $\delta$ can be calculated by the following equation for each time step $t_1, t_2, t_3 \ldots$ $$\begin{bmatrix} \dot{v}_y \\ \dot{w} \end{bmatrix} = \begin{bmatrix} -\dfrac{C_f + C_r}{mv_x} & \dfrac{bC_r - aC_f}{mv_x} - v_x \\ \dfrac{bC_r - aC_f}{Iv_x} & \dfrac{a^2 C_f + b^2 C_r}{Iv_x} \end{bmatrix} \begin{bmatrix} v_y \\ w \end{bmatrix} + \begin{bmatrix} \dfrac{C_f}{m} \\ \dfrac{aC_f}{I} \end{bmatrix} \cdot \delta, \quad (11)$$

where m is the vehicle mass, I is vehicle inertia, $C_f$ and $C_r$ are front and rear cornering stiffness, respectively, a is the distance from the vehicle center to the front axle and b is the distance from the vehicle center to the rear axle.

Once the steering angle δ is determined for each point in time, the steering torque τ associated with each steering angle δ to maintain the vehicle on the desired path needs to be determined to determine whether any of the torques exceed the maximum torque allowable by the lane keeping/lane centering system 34. The steering torque τ can be determined by any suitable technique known to those skilled in the art. For example, the following equations can be used to provide that calculation.

$$\frac{\delta}{\tau_{total}} = z^{-D} \frac{c_0 + c_1 z^{-1} + \ldots + c_n z^{-n}}{1 + d_1 z^{-1} + d_2 z^{-2} + \ldots + d_m z^{-m}}, \quad (12)$$

$$\tau_{total} = \tau_{driver} + \tau_{EPS} + \tau_{SAT}, \quad (13)$$

where the steering angle δ is measured by a sensor, $\tau_{driver}$ is the driver's steering input torque that is assumed to be zero during the modeling process, $\tau_{EPS}$ is a known EPS motor torque command, $\tau_{SAT}$ is a steering self-aligning torque that can be estimated from a dynamic equation or empirical data set, discussed in detail below, n and m are the system orders and can be, for example, 2 and 3, respectively, $z^{-1}$ represents a one-step delay, $z^{-2}$ represents a two-step delay, etc. in the response of the steering system of the vehicle 52, and D is a pure time delay in the number of sample times.

Depending on the accuracy of the model, the system orders n and m can be increased. The values $c_0, \ldots, c_n$ and $d_1, \ldots, d_m$ are unknown, where the object is to find the unknown parameters $c_0, \ldots, c_n$ and $d_1, \ldots, d_m$ in equation (12). In one embodiment, training methods employing an auto-regressive moving average model can be employed to obtain the unknown parameters during vehicle testing, as will be discussed below.

Equation (12) models the steering system with a system delay and the history of the past steering angle and torque data. The model does not require prior knowledge of tire and steering dynamics. The parameters $c_0, \ldots, c_n$ and $d_1, \ldots, d_m$ are obtained during vehicle testing using measured steering angle and steering torque data, and then provided in tables during vehicle operation so that the steering torque τ can be calculated from equation (12) using the known steering angle δ. It is noted that equation (12) is one technique for determining the steering torque τ based on the steering angle δ. However, other techniques may be known in the art for determining the steering torque τ based on the steering angle δ that may be applicable to the invention discussed above.

Figure 6:
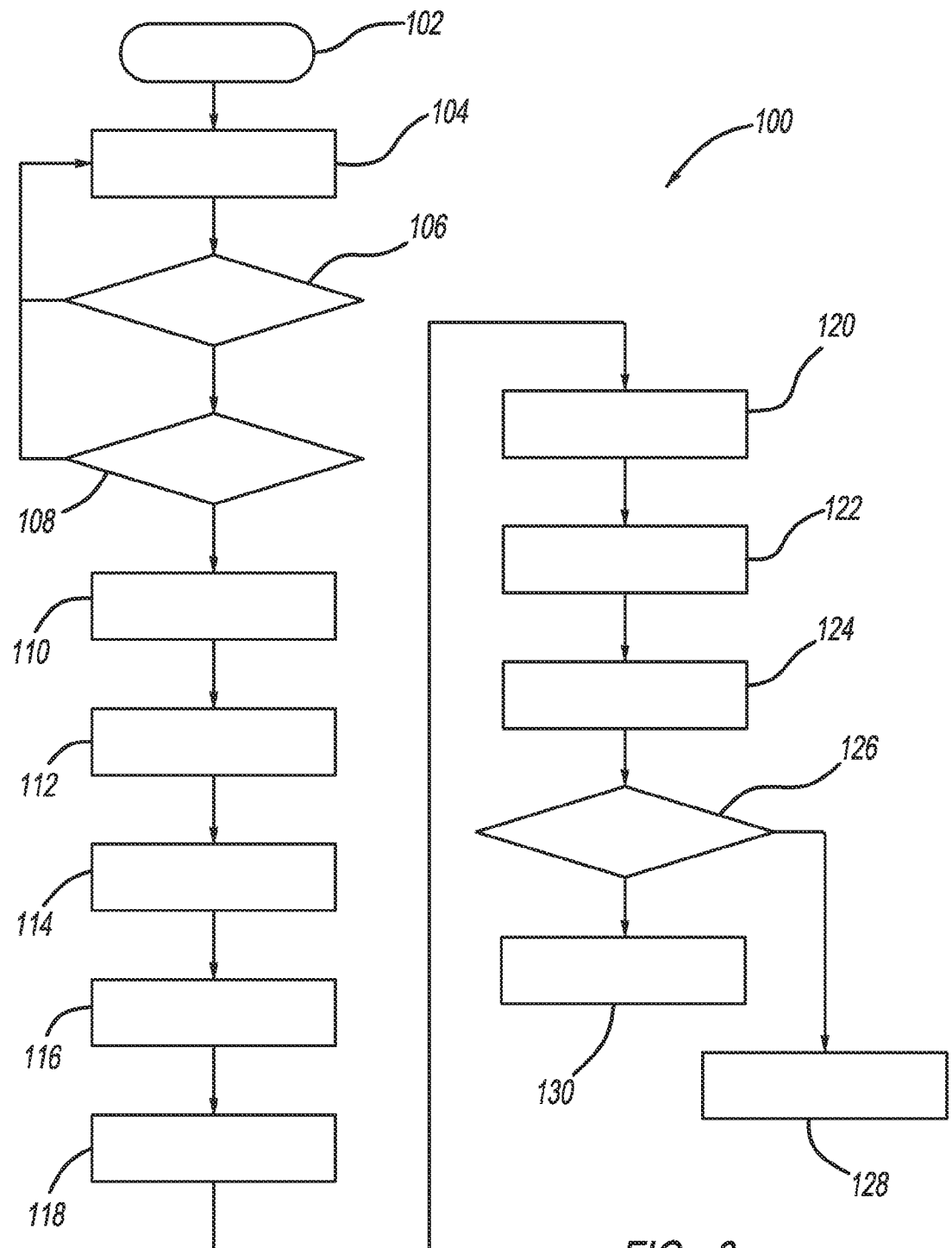
FIG. 6 is a flow chart diagram showing a process for determining whether to issue a driver alert if a lane centering/lane keeping system requires a steering torque that exceeds the maximum torque limit.

FIG. 6 is a flow chart diagram 100 showing a process for determining whether a driver alert will be given if the lane centering/lane keeping system 34 requires a steering torque that exceeds the maximum torque limit of the system 34 based on the discussion above. The algorithm starts at oval 102 and waits at box 104 when the lane centering system 34 is disengaged. The algorithm then determines whether there is a driver request for engaging the lane centering system 34 at decision diamond 106, and if not, the algorithm returns to the box 104. If there is a request by the driver to engage the lane centering system 34, the algorithm checks to determine whether lane centering is available at decision diamond 108 based on whether the requirements for following the lane, such as lane markers, can be employed to provide the lane centering. If lane centering is not available at the decision diamond 108, then the algorithm returns to the box 104, but if lane centering is available at the decision diamond 108, the algorithm proceeds to box 110 to engage the lane centering system 34.

Once the lane centering system 34 is engaged, the algorithm captures the lane data required at box 112 to provide the lane centering and generates the desired vehicle path at box 114 as discussed above. The vehicle path is then predicted at box 116 and the vehicle motion is then determined at box 118 as discussed above at the block 84. The algorithm then calculates the steering angle δ from the predicted vehicle motion at box 120 in the manner discussed above at the block 86. The algorithm then obtains the steering dynamics at box 122 to calculate the steering torque τ based on the calculated steering angle δ and then calculates the steering torque τ at box 124. The algorithm calculates the steering angle δ and the steering torque τ for all of the sample times. The algorithm determines whether any of the steering torques τ exceed the predetermined maximum torque limit at decision diamond 126, and if not, does not issue a driver alert at box 128, but if any do exceed the limit, issues the driver alert at box 130.

The need for determining the vehicle steering torque τ based on the steering angle δ is a common problem in most automatic steering control situations. In known systems, the steering angle sensor 36 measures the steering wheel angle δ, but sensors are not available to directly measure the road wheel angle, and thus road wheel angles are typically estimated by a steering model. Known steering models that can be used to convert the vehicle steering angle δ to the vehicle steering torque τ, such as Paceka's steering model, shown by equations (14)-(17) below, where variables in these equations can be found in FIG. 1, typically require high computing power and are often not applicable for fast running vehicle motion control features. Further, steering dynamics are different in low speed versus high speed vehicle motion. Thus, the known steering models typically cannot be directly applicable to a lane centering system because of limited computing power, the non-existence of a road wheel angle sensor and the inaccuracy of stop and go situations.

$$T_{driver} = (N^2 I_{motor} + I_{str})\ddot{\theta} + (N^2 C_{motor} + C_{str})\dot{\theta} + \quad (14)$$
$$N \cdot T_{motor} + T_{road} + T_{torsion} + T_{self} + T_{tire},$$

$$T_{torsion} = k \cdot (\theta_{str} - \theta_{pinion}) + c \cdot (\dot{\theta}_{str} + \dot{\theta}_{pinion}), \quad (15)$$

$$T_{tire} = \mu \cdot F_z \cdot \quad (16)$$
$$\sin\left(C \cdot \tan^{-1}\left(\frac{C_{Fa}}{C \cdot \mu \cdot F_z} \cdot x - E \cdot \left(\frac{C_{Fa}}{C \cdot \mu \cdot F_z} \cdot x - \tan^{-1}\left(\frac{C_{Fa}}{C \cdot \mu \cdot F_z}\right)\right)\right)\right),$$

$$T_{self} = 2\xi \cdot C_f \left(\delta - \frac{\dot{y} + a \cdot r}{v_x}\right). \quad (17)$$

Equation (12) can be used for these applications other than the driver alert process discussed above. Equation (12) provides a generalized high order steering model that can provide more accuracy and performance with limited computing power. If high accuracy is not required, then equation

(12) can reduce the complexity for faster operation. As will be discussed in further detail below, equation (12) provides a balance and accuracy in computing power.

Figure 7:
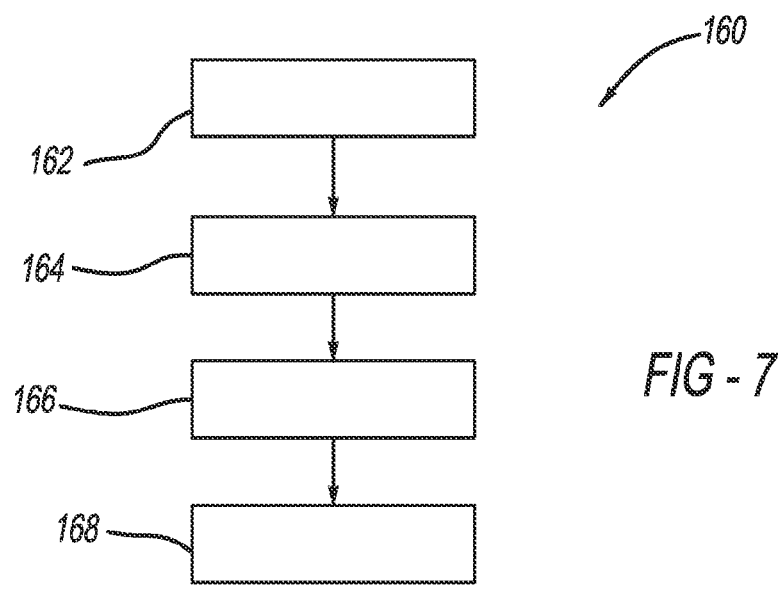
FIG. 7 is a flow chart diagram showing an overview of a process for developing a steering model for converting steering angle to the steering torque.

FIG. 7 is a flow chart diagram 160 showing an overview of a process for developing a steering model for converting steering angle δ to the steering torque τ. At box 162, the algorithm determines an estimation of the self-aligning torque $\tau_{SAT}$ which can be performed using a dynamic equation or an empirical data set. For the embodiment where the torque $\tau_{SAT}$ is estimated from a dynamic equation, equation (18) below can be used.

$$\tau_{SAT} = -K_1\delta + K_2 a_y - \frac{K_3}{v_x}w, \quad (18)$$

$$K_1 = (L_p + L_m)C_f\left(1 + \frac{C_f}{m}\right), \quad (19)$$

where:

$$K_2 = \frac{(L_p + L_m)C_f}{C_f + C_r}m, \quad (20)$$

$$K_3 = \frac{(L_p + L_m)C_f}{C_f + C_r}m(cC_f - dC_r), \quad (21)$$

and where $K_1$, $K_2$, and $K_3$ are known constants from tire characteristics as a function of front and rear tire stiffness $C_f$ and $C_r$, m is vehicle mass, w is the vehicle yaw rate, $L_p$ is pneumatic trail, and $L_m$ is mechanical trail. All of these parameters are known and considered constant for small slip angle as employed in lane centering/lane keeping systems. The mechanical trail $L_m$ is purely a function of steering geometry and can be determined from the road wheel caster angle.

Determining the self-aligning torque $\tau_{SAT}$ using an empirical data set can be performed as follows. The empirical based estimation technique uses pre-collected data sets and models the torque $\tau_{SAT}$ as a two-dimensional look-up table, $\tau_{SAT}$=f(speed, steering angle). To estimate the torque $\tau_{SAT}$ from the empirical data, a vehicle is driven with a known initial steering angle, such as 10°, 20°, 30°, etc., and pre-specified vehicle speed, such as 10 mph, 20 mph, 30 mph, etc. Next, a steering torque is applied to the vehicle steering system and the steering torque is increased until the steering wheel 12 goes to a steady state. The steering torque that keeps the steering wheel 12 at the initial steering angle is the self-aligning torque $\tau_{SAT}$. Note that current steering systems have a capacity to generate a steering torque from a computer command. The above steps are repeated at various steering wheel angles and vehicle speeds, and a complete look-up table is populated.

At box 164, an off-line steering model is employed to provide an angle to torque estimation, where the model orders n and m are selected for the particular application. The off-line steering model can be equation (12) rewritten as:

$$\delta(k) = \begin{bmatrix} -d_1 & \ldots & -d_m & c_0 & \ldots & c_n \end{bmatrix}\begin{bmatrix} \delta(k-1) \\ \vdots \\ \delta(k-m) \\ \tau_{total}(k-D) \\ \vdots \\ \tau_{total}(k-D-n) \end{bmatrix}, \quad (22)$$

where k is the current time step and k−1 is the previous time step.

The pure time delay D in equation (22) can be found by a separate test procedure, such as by a step response test, i.e., send a step torque command to the steering system and measure the time difference between the time that the torque command was sent and the time that the steering system starts moving.

The algorithm then applies known steering torque commands and measures the steering angle δ at each time step, such as every 10 ms. For the example where m=3 and n=2, the process collects at least five data sets to solve for the parameters $c_0$, $c_1$, $c_2$, $d_1$ and $d_2$. The algorithm then applies a least-square method to solve equation (22) to obtain these parameters.

The algorithm then considers speed variations in the off-line model at box 166. Steering dynamics vary depending on the vehicle speed. For improved accuracy in the torque conversion, three speed variations are offered for the steering model including low speed L, medium speed M and high speed H. Equation (12) is rewritten below for each of these speeds. The variables $c_0, \ldots, c_n$ and $d_1, \ldots, d_m$ are determined for each speed as above.

$$\frac{\delta_L}{\tau_{total,L}} = z^{-D}\frac{c_{L,0} + c_{L,1}z^{-1} + \ldots + c_{L,n}z^{-n}}{1 + d_{L,1}z^{-1} + d_{L,2}z^{-2} + \ldots + d_{L,m}z^{-m}}, \quad (23)$$

$$\frac{\delta_M}{\tau_{total,M}} = z^{-D}\frac{c_{M,0} + c_{M,1}z^{-1} + \ldots + c_{M,n}z^{-n}}{1 + d_{M,1}z^{-1} + d_{M,2}z^{-2} + \ldots + d_{M,m}z^{-m}}, \quad (24)$$

$$\frac{\delta_H}{\tau_{total,H}} = z^{-D}\frac{c_{H,0} + c_{H,1}z^{-1} + \ldots + c_{H,n}z^{-n}}{1 + d_{H,1}z^{-1} + d_{H,2}z^{-2} + \ldots + d_{H,m}z^{-m}}. \quad (25)$$

The pure time delay D is not a function of the vehicle speed, and will remain the same in all speed variations.

Figure 8:
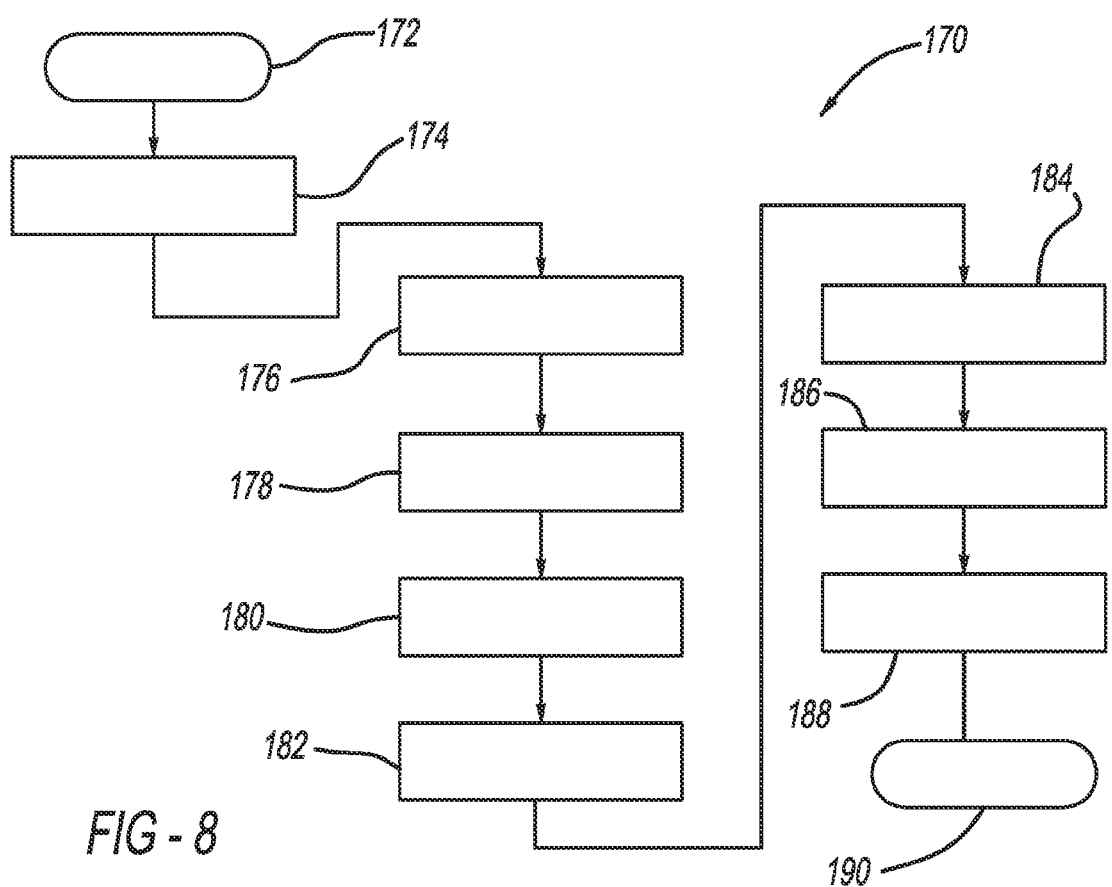
FIG. 8 is a flow chart diagram showing an off-line part of the process depicted in FIG. 7.

FIG. 8 is a flow chart diagram 170 showing the operation for the off-line part of the algorithm discussed above for boxes 162, 164 and 166. The algorithm starts at oval 172, and estimates the self-aligning steering torque $\tau_{SAT}$ from either the dynamic equation or the look-up table at box 174. The algorithm then applies known steering torque commands at box 176, and measures and records the steering wheel angle δ for those torques at box 178. The algorithm then records the steering torque command τ at box 180 and finds the nominal steering model parameters at box 182. The algorithm then updates the steering model for low speed at box 184, for medium speed at box 186 and for high speed at box 188, and the algorithm ends at oval 190. As a result of this off-line process, all of the parameters c and d from the off-line models of equations (23), (24) and (25) will be determined.

Returning to FIG. 7, the algorithm then uses the off-line models of equations (23), (24) and (25) discussed above and automatically adjusts the models in real-time during vehicle operation at box 168. Particularly, the following discussion describes a technique for how the steering model in equation (22) can be automatically adjusted in real-time while the lane centering system is operational when the model is no longer generating an accurate torque conversion. First, equation (22) is rewritten as:

$$\phi^T(k) = [\delta(k-1)\delta(k-2)\ldots\delta(k-m)\tau(k-D-1)\ldots\tau(k-D-n)] \quad (26)$$

$$\hat{\theta}^T(k) = [-d_1\ldots-d_m c_0\ldots c_n]. \quad (27)$$

As above, the steering and torque values δ(k), δ(k−1), . . . , τ(k−D), τ(k−D−1), . . . are measured data and the parameters $c_0, \ldots, c_n$ and $d_1, \ldots, d_m$ are calculated using the least-square process. The angle $\hat{\theta}(k-1)$ is the parameter set that is solved at the previous time step. This parameter set will be updated to the angle $\hat{\theta}(k)$ with the new measured data set $\phi(k)$. The updated equation is given by:

$$\hat{\theta}(k) = \hat{\theta}(k-1) + \frac{P(k-1)\varphi(k)}{\lambda + \varphi^T(k)P(k-1)\varphi(k)}(\delta(k) - \varphi^T(k)\hat{\theta}(k-1)), \quad (28)$$

$$P(k) = \frac{1}{\lambda}\left(P(k-1) - \frac{P(k-1)\varphi(k)\varphi^T(k)P(k-1)}{\lambda + \varphi^T(k)P(k-1)\varphi(k)}\right), \quad (29)$$

where $\lambda$ is a forgetting factor set between 0 to 1 and is tunable.

Figure 9:
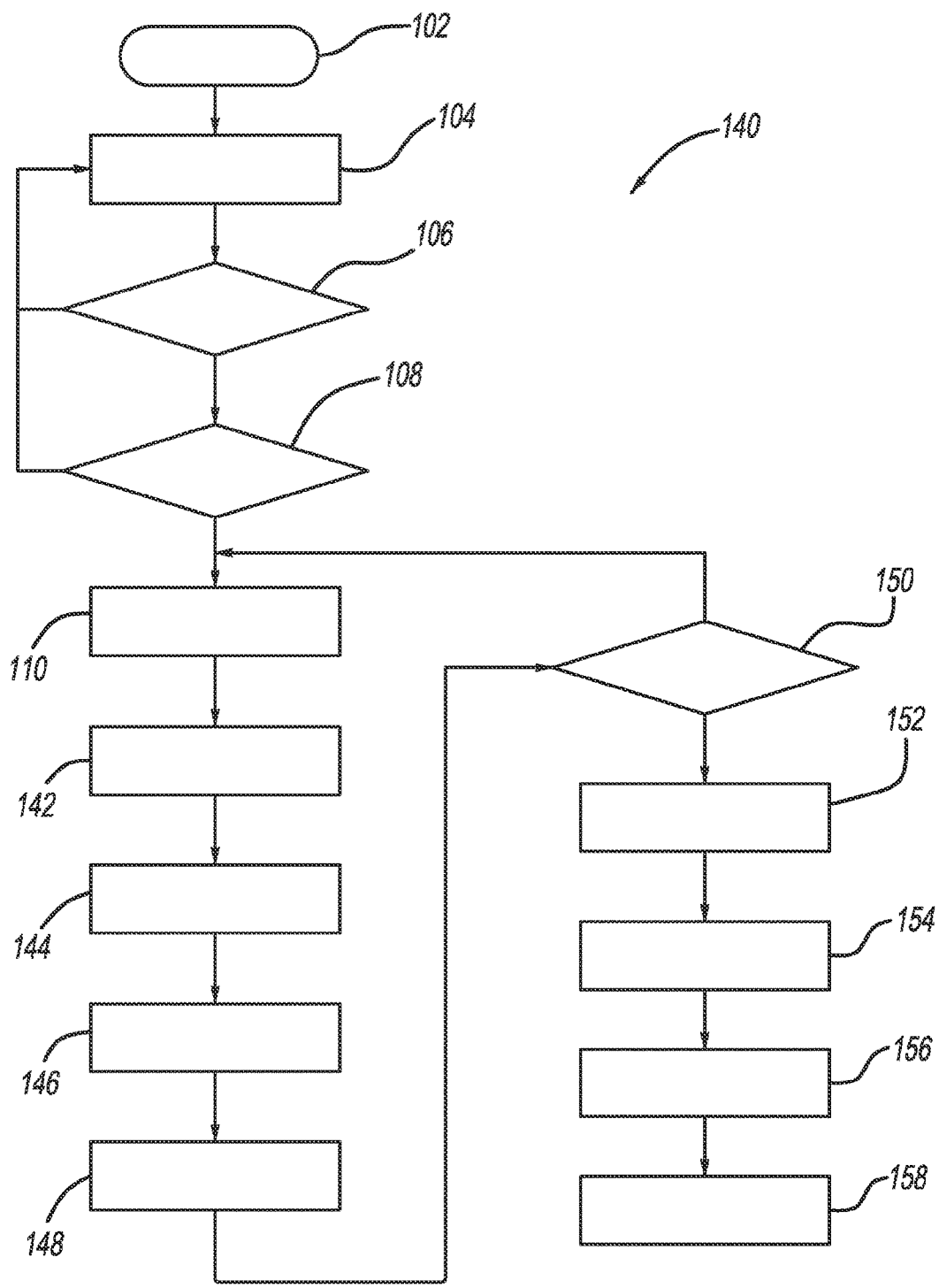
FIG. 9 is a flow chart diagram showing a process for updating the steering model depicted in FIG. 7 in real-time.

The process applies the updated equation for all speed variation steering models (low, medium, and high speed) during operation of the vehicle. FIG. 9 is a flow chart diagram 140 showing a process for updating the steering model discussed above in real-time, where like steps to the flow chart diagram 100 are identified by the same reference number. Once the lane centering system 34 is engaged at the box 110, the algorithm then engages the steering model updating algorithm at box 142. Once the steering model updating algorithm is engaged, the algorithm measures and records the steering wheel angle $\delta$ at box 144, estimates the self-aligning steering torque $\tau_{SAT}$ at box 146, and records the steering torque command $\tau$ at box 148 for each steering wheel angle $\delta$. The algorithm then determines whether the parameter changes are greater than a predetermined threshold at decision diamond 150, and if not, meaning that the current steering model is providing an accurate conversion of the steering angle to steering torque, returns to determining whether the lane center/lane keeping system 34 has been engaged at the box 110. If the parameters are greater than the threshold at the decision diamond 150, meaning that the current steering model is not providing an accurate conversion of the steering angle to steering torque, then the algorithm updates the on-line steering model at box 152 as discussed above. The algorithm then applies the low speed steering model at box 154, applies the medium speed steering model at box 156 and applies the high speed steering model at box 158.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a vehicle steering torque exceeds a predetermined maximum steering torque limit in advance while a vehicle is being controlled by a lane keeping system, said method comprising:
   obtaining lane information concerning a lane that the vehicle is traveling in at a predetermined number of sample times in the future;
   generating a desired path for the vehicle to maintain the vehicle in the lane;
   obtaining vehicle motion information required to maintain the vehicle on the desired path at each of the sample times;
   determining steering angles for the vehicle that are necessary for the vehicle to track the desired path at each of the sample times based on the desired path and the vehicle motion information;
   determining the vehicle steering torque required to steer the vehicle for each of the steering angles;
   determining whether any of the steering torques exceeds the predetermined maximum steering torque limit; and
   issuing an alert if any of the steering torques does exceed the predetermined maximum steering torque limit prior to the lane keeping system being required to command that torque to steer the vehicle.

2. The method according to claim 1 wherein generating a desired path includes using a polynomial equation.

3. The method according to claim 2 wherein the polynomial equation is:

$$y_n(x_n) = a_0 + a_1 x_n + a_2 x_n^2 + a_3 x_n^3 + a_4 x_n^4 + a_5 x_n^5$$

$$0 \le x_n = \frac{x}{v_x \Delta T} \le 1$$

$$y_n = \frac{y}{L}$$

where x is the longitudinal distance from the vehicle center, y is the lateral distance from the vehicle center, $v_x$ is the vehicle longitudinal speed, L is the lane width, $\Delta T$ is the time of the path generation distance, and a are coefficients.

4. The method according to claim 1 wherein obtaining vehicle motion information includes obtaining vehicle longitudinal speed v, vehicle lateral speed $v_y$, vehicle yaw rate w, vehicle lateral acceleration $a_y$ and vehicle yaw acceleration $\dot{w}$.

5. The method according to claim 4 wherein obtaining vehicle motion information can be directly determined from desired path parameters and using the equations:

$$v_y = \dot{y} - v_x \phi$$

$$\dot{y} = dy/dt = y' v_x$$

$$y' = 5a_5 x^4 + 4a_4 x^3 + 3a_3 x^2 + 2a_2 x + a_1$$

$$a_y = \ddot{y} = d^2 y/dt^2 = y'' v_x^2 + y' a_x$$

$$y'' = 20a_5 x^3 + 12a_4 x^2 + 6a_3 x + 2a_2$$

$$w = y'$$

$$\dot{w} = d(y')/dt = y'' v_x.$$

6. The method according to claim 1 wherein determining steering angles for the vehicle includes using the equation:

$$\begin{bmatrix} \dot{v}_y \\ \dot{w} \end{bmatrix} = \begin{bmatrix} -\dfrac{C_f + C_r}{mv_x} & \dfrac{bC_r - aC_f}{mv_x} - v_x \\ \dfrac{bC_r - aC_f}{Iv_x} & \dfrac{a^2C_f + b^2C_r}{Iv_x} \end{bmatrix} \begin{bmatrix} v_y \\ w \end{bmatrix} + \begin{bmatrix} \dfrac{C_f}{m} \\ \dfrac{aC_f}{I} \end{bmatrix} \cdot \delta$$

where $v_y$ is the vehicle lateral speed, $v_x$ is the vehicle longitudinal speed, w is the vehicle yaw rate, m is vehicle mass, δ is vehicle steering angle, I is vehicle inertia, $C_f$ is front cornering stiffness, $C_r$ is rear cornering stiffness, and a is the distance from the vehicle center to a front axle, and b is the distance from the vehicle center to a rear axle.

7. The method according to claim 1 wherein determining the vehicle steering torque includes using the equation:

$$\dfrac{\delta}{\tau_{total}} = z^{-D} \dfrac{c_0 + c_1 z^{-1} + \ldots + c_n z^{-n}}{1 + d_1 z^{-1} + d_2 z^{-2} + \ldots + d_m z^{-m}}$$

where $\tau_{total}$ is total torque and includes a self-aligning torque, driver initiated torque and steering system torque, δ is the vehicle steering angle, z is a variable representing system delay for a response of the steering system, D is a pure time delay as the number of sample time steps, c and d are steering system parameters, and n and m are system orders.

8. The method according to claim 7 wherein the variables c and d are solved using a least-square method.

9. The method according to claim 1 wherein generating a desired path includes generating a vehicle lateral distance and a vehicle heading angle.

10. A method for determining whether a vehicle steering torque exceeds a predetermined maximum steering torque limit while a vehicle is being controlled by a lane keeping system, said method comprising:

obtaining lane information concerning a lane that the vehicle is traveling in at a predetermined number of sample times in the future;

generating a desired path for the vehicle to maintain the vehicle in the lane including determining vehicle lateral distance and vehicle heading angle at each sample time;

obtaining vehicle motion information required to maintain the vehicle on the desired path at each of the sample times including obtaining vehicle longitudinal speed, vehicle lateral speed, vehicle yaw rate, vehicle lateral acceleration and vehicle yaw acceleration;

determining steering angles for the vehicle that are necessary for the vehicle to track the desired path at each of the sample times based on the desired path and the vehicle motion information;

determining the vehicle steering torque required to steer the vehicle for each of the steering angles;

determining whether any of the steering torques exceeds the predetermined maximum steering torque limit; and issuing an alert if any of the steering torques does exceed the predetermined maximum steering torque limit prior to the lane keeping system being required to command that torque to steer the vehicle.

11. The method according to claim 10 wherein determining steering angles for the vehicle includes using the equation:

$$\begin{bmatrix} \dot{v}_y \\ \dot{w} \end{bmatrix} = \begin{bmatrix} -\dfrac{C_f + C_r}{mv_x} & \dfrac{bC_r - aC_f}{mv_x} - v_x \\ \dfrac{bC_r - aC_f}{Iv_x} & \dfrac{a^2C_f + b^2C_r}{Iv_x} \end{bmatrix} \begin{bmatrix} v_y \\ w \end{bmatrix} + \begin{bmatrix} \dfrac{C_f}{m} \\ \dfrac{aC_f}{I} \end{bmatrix} \cdot \delta$$

where $v_y$ is the vehicle lateral speed, $v_x$ is the vehicle longitudinal speed, w is the vehicle yaw rate, m is vehicle mass, δ is vehicle steering angle, I is vehicle inertia, $C_f$ is front cornering stiffness, $C_r$ is rear cornering stiffness, and a is the distance from the vehicle center to a front axle, and b is the distance from the vehicle center to a rear axle.

12. The method according to claim 10 wherein determining the vehicle steering torque includes using the equation:

$$\dfrac{\delta}{\tau_{total}} = z^{-D} \dfrac{c_0 + c_1 z^{-1} + \ldots + c_n z^{-n}}{1 + d_1 z^{-1} + d_2 z^{-2} + \ldots + d_m z^{-m}}$$

where $\tau_{total}$ is total torque and includes a self-aligning torque, driver initiated torque and steering system torque, δ is the vehicle steering angle, z is a variable representing system delay for a response of the steering system, D is a pure time delay as the number of sample time steps, c and d are steering system parameters, and n and m are system orders.

13. The method according to claim 12 wherein the variables c and d are solved using a least-square method.

14. An alert system for determining whether a vehicle steering torque exceeds a predetermined maximum steering torque limit while a vehicle is being controlled by lane keeping system, said alert system comprising:

means for obtaining lane information concerning a lane that the vehicle is traveling in at a predetermined number of sample times in the future;

means for determining a desired path for the vehicle to maintain the vehicle in the lane;

means for obtaining vehicle motion information required to maintain the vehicle on a desired path at each of the sample times;

means for determining steering angles for the vehicle that are necessary for the vehicle to track the desired path at each of the sample times based on the desired path and the vehicle motion information;

means for determining the vehicle steering torque required to steer the vehicle for each of the steering angles;

means for determining whether any of the steering torques exceeds the predetermined maximum steering torque limit; and means for issuing an alert if any of the steering torques does exceed the predetermined maximum steering torque limit prior to the lane keeping system being required to command that torque to steer the vehicle.

15. The alert system according to claim 14 wherein the means for generating a desired path uses a polynomial equation.

16. The alert system according to claim 15 wherein the polynomial equation is:

$$y_n(x_n) = a_0 + a_1 x_n + a_2 x_n^2 + a_3 x_n^3 + a_4 x_n^4 + a_5 x_n^5$$

$$0 \le x_n = \dfrac{x}{v_x \Delta T} \le 1$$

-continued $$y_n = \frac{y}{L}$$

where x is the longitudinal distance from the vehicle center, y is the lateral distance from the vehicle center, $v_x$ is the vehicle longitudinal speed, L is the lane width, ΔT is the time of the path generation distance, and a are coefficients.

17. The alert system according to claim 14 wherein the means for obtaining vehicle motion information obtains vehicle longitudinal speed v, vehicle lateral speed $v_y$, vehicle yaw rate w, vehicle lateral acceleration $a_y$, and vehicle yaw acceleration $\dot{w}$.

18. The alert system according to claim 14 wherein the means for determining steering angles for the vehicle uses the equation:

$$\begin{bmatrix} \dot{v}_y \\ \dot{w} \end{bmatrix} = \begin{bmatrix} -\frac{C_f + C_r}{mv_x} & \frac{bC_r - aC_f}{mv_x} - v_x \\ \frac{bC_r - aC_f}{Iv_x} & \frac{a^2 C_f + b^2 C_r}{Iv_x} \end{bmatrix} \begin{bmatrix} v_y \\ w \end{bmatrix} + \begin{bmatrix} \frac{C_f}{m} \\ \frac{aC_f}{I} \end{bmatrix} \cdot \delta$$

where $v_y$ is the vehicle lateral speed, $v_x$ is the vehicle longitudinal speed, w is the vehicle yaw rate, m is vehicle mass, δ is vehicle steering angle, I is vehicle inertia, $C_f$ is front cornering stiffness, $C_r$ is rear cornering stiffness, and a is the distance from the vehicle center to a front axle, and b is the distance from the vehicle center to a rear axle.

19. The alert system according to claim 14 wherein the means for determining the vehicle steering torque uses the equation:

$$\frac{\delta}{\tau_{total}} = z^{-D} \frac{c_0 + c_1 z^{-1} + \ldots + c_n z^{-n}}{1 + d_1 z^{-1} + d_2 z^{-2} + \ldots + d_m z^{-m}}$$

where $\tau_{total}$ is total torque and includes a self-aligning torque, driver initiated torque and steering system torque, δ is the vehicle steering angle, z is a variable representing system delay for a response of the steering system, D is a pure time delay as the number of sample time steps, c and d are steering system parameters, and n and m are system orders.

20. The alert system according to claim 19 wherein the variables c and d are solved using a least-square method.

* * * * *